US 6,729,207 B2

(12) United States Patent
Allmandinger et al.

(10) Patent No.: US 6,729,207 B2
(45) Date of Patent: May 4, 2004

(54) RIGID DRIVE AXLE ASSEMBLY FOR MOTOR VEHICLES

(75) Inventors: Timothy Bernard Allmandinger, Roanoke, IN (US); Sean Karl Hoefer, Wabash, IN (US); Gregory James Maser, Ft. Wayne, IN (US); Edward Eugene Stuart, Payne, OH (US); Earl James Irwin, Fort Wayne, IN (US); Parvinder Singh Nanua, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/101,188

(22) Filed: Mar. 20, 2002

(65) Prior Publication Data

US 2003/0177859 A1 Sep. 25, 2003

(51) Int. Cl.$^7$ .............................................. F16H 57/02
(52) U.S. Cl. ........................................................ 74/607
(58) Field of Search ........................... 74/607; 29/462, 29/463; 180/378, 379

(56) References Cited

U.S. PATENT DOCUMENTS

| 662,372 A | 11/1900 | Dooley |
| 1,076,560 A | 10/1913 | Duffy |
| 1,760,109 A | 5/1930 | Bizzarri |
| 2,015,969 A | 10/1935 | Schildknecht |
| 3,673,888 A | * 7/1972 | Moll et al. ..................... 74/607 |
| 3,793,703 A | * 2/1974 | Winkler et al. ................ 29/463 |
| 4,068,541 A | * 1/1978 | Sakamoto et al. ............. 74/607 |
| 4,234,120 A | * 11/1980 | Pringle ..................... 228/173.6 |
| 4,310,200 A | * 1/1982 | Olender ....................... 301/129 |
| 4,594,912 A | * 6/1986 | Ishikawa ....................... 74/607 |
| 4,736,821 A | * 4/1988 | Ries ............................ 188/71.6 |
| 4,841,802 A | * 6/1989 | Peck ............................. 74/607 |
| 5,271,294 A | 12/1993 | Osenbaugh ................... 74/607 |
| 5,620,388 A | * 4/1997 | Schlegelmann et al. ..... 475/230 |
| 6,024,418 A | * 2/2000 | Ebert ........................... 301/130 |
| 6,189,413 B1 | * 2/2001 | Morse et al. .................. 74/607 |
| 6,401,869 B1 | * 6/2002 | Iida et al. ................... 184/6.25 |

* cited by examiner

Primary Examiner—Chong H. Kim
(74) Attorney, Agent, or Firm—Liniak, Berenato & White (57) ABSTRACT

A rigid drive axle assembly for motor vehicles, includes a support beam member having a substantially flat, enlarged central section and two opposite arm sections axially outwardly extending from the central section, a differential assembly secured to the flat central section of the support beam member, and two opposite axle shaft members outwardly extending from the differential assembly and rotatably supported by the arm sections in a spaced relationship with respect to the central section of the support beam member. The differential assembly includes a differential carrier frame member fastened to the central section of the support beam member, and provided for rotatably supporting a differential case and a drive pinion. The differential assembly is enclosed into a housing formed by a rear cover and a front cover secured to opposite surfaces of the central section of the support beam member. The rear cover incorporates two throughholes provided with self-centering seals.

29 Claims, 9 Drawing Sheets

RIGID DRIVE AXLE ASSEMBLY FOR MOTOR VEHICLES

BACKGROUND OF THE INVENTION

1. Field of the Invention

The present invention relates to axle assemblies for motor vehicles in general, and more particularly to a rigid drive axle assembly including a support beam member having a substantially flat central section and two opposite axle shaft members rotatably supported in a spaced relationship with respect to the central section of the support beam member.

2. Description of the Prior Art

Rigid drive axle assemblies are well known structures that are in common use in most motor vehicles. Such axle assemblies include a number of components that are adapted to transmit rotational power from an engine of the motor vehicle to wheels thereof. Typically, the rigid drive axle assembly includes a hollow axle housing, a differential, which is rotatably supported within the axle housing by a non-rotating carrier. The differential is connected between an input drive shaft extending from the vehicle engine and a pair of output axle shafts extending to the vehicle wheels. The axle shafts are contained in respective non-rotating tubes that are secured to the carrier. Thus, rotation of the differential by the drive shaft causes corresponding rotation of the axle shafts. The carrier and the tubes form a housing for these drive train components of the axle assembly, inasmuch as the differential and the axle shafts are supported for rotation therein.

Figure 1:
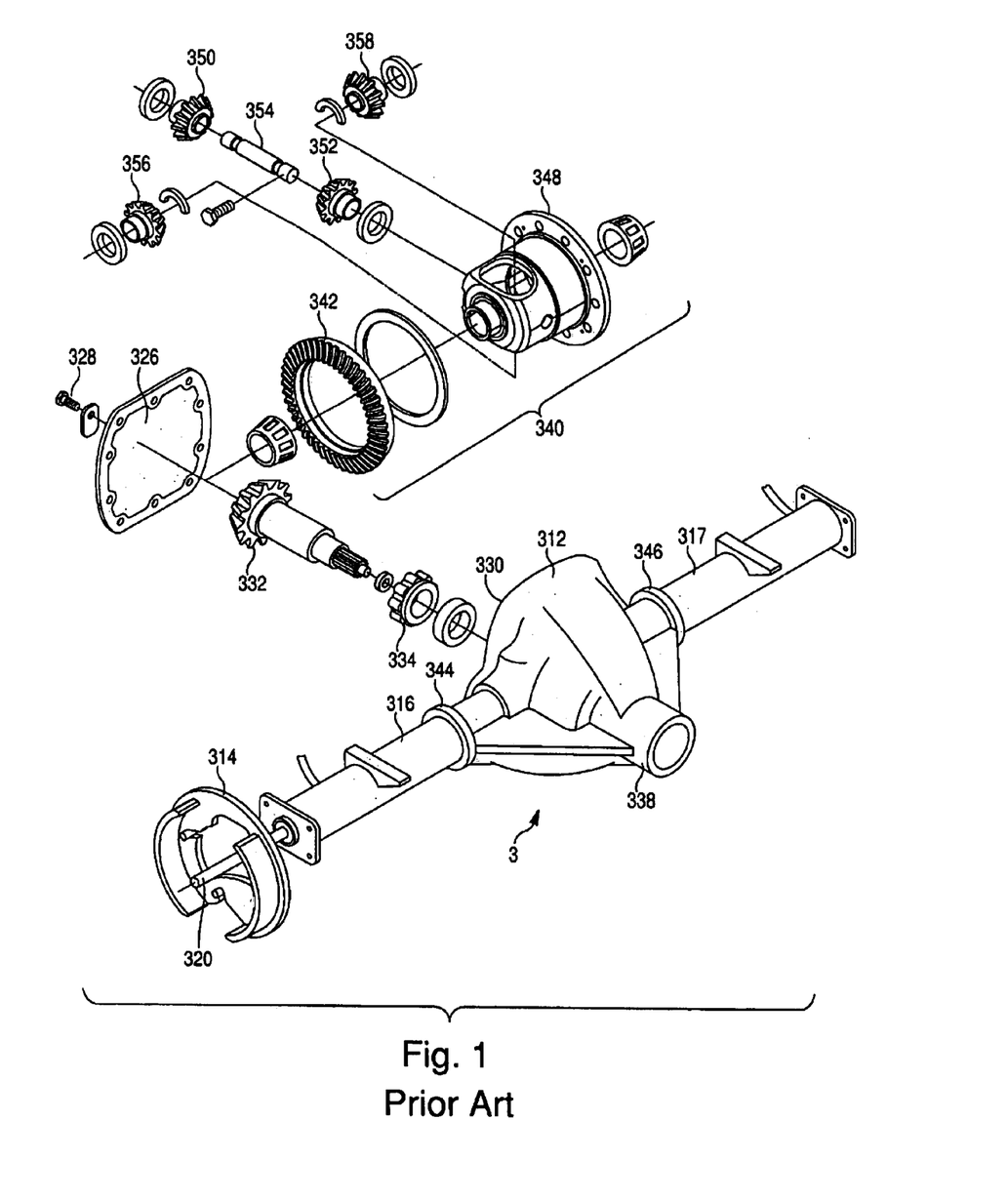
FIG. 1 is an exploded perspective view of a typical Salisbury type drive axle assembly of the prior art.

The axle housings are generally classified into two basic types. The first axle housing type is a unitized carrier construction, commonly referred to as a Salisbury or Spicer type axle assembly, illustrated in FIG. 1. In this structure, the Salisbury type axle assembly 301 includes a carrier 312 (which houses the rotatable differential mechanism 340) is directly connected to the two tubes 316 and 317 (which house the rotatable axle shafts 320). An opening is provided at the rear of the carrier to permit assembly of the differential therein. A cover 326 closes this opening during the use. The cover 326 is connected by bolts 328 to a rear face 330 of the carrier 312 hydraulically seals the housing against the passage of lubricant. A brake assembly 314 located at the end of a tube 316 extending outboard from the ends of an axle carrier 312. Located within the differential case is a drive pinion 332 rotatably supported by a rear drive pinion bearing 334 and a front drive pinion bearing (not shown) supported on the inner surface of a portion of the axle carrier casing 338 that extends forward from the center line of the axle assembly. A driveshaft, driveably connected to the output shaft of a transmission, is coupled to the shaft of the drive pinion 332. The differential mechanism 340, located within the differential case 348, includes a ring gear 342, in continuous meshing engagement with drive pinion 332 and supported rotatably on the differential rear drive pinion bearing 334 and the front drive pinion bearing located within the housing gear and cylindrical extension 338 of the carrier 312. The axle carrier 312 also includes laterally directed tubular extensions 344, 346, which receive therein the ends of housing tubes 316 and 317, respectively. Located within the carrier 312 is a differential case 348, on which bevel pinion gears 350, 352 are supported for rotation on a differential pinion shaft 354. Side bevel gears 356, 358 are in continuous meshing engagement with pinions 350, 352 and are driveably connected to left and right axle shafts 320, located respectively within tubes 316 and 317. The axle shaft 320 is connected to the corresponding side bevel gear 356. Unitized carrier axle housing constructions of this type are economical to manufacture and are readily adaptable for a variety of vehicles.

Figure 2:
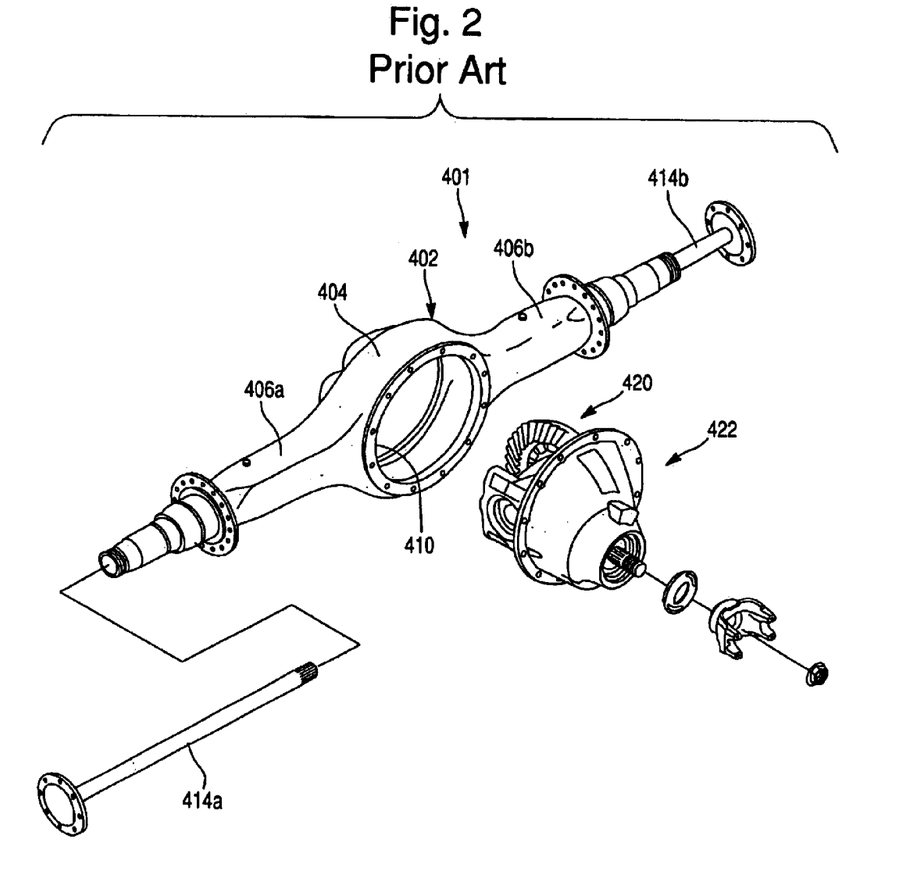
FIG. 2 is an exploded perspective view of a typical Banjo type drive axle assembly of the prior art.

The second axle housing type is a separable carrier construction, and is commonly referred to as a Banjo type axle, illustrated in FIG. 2. In this structure, the Banjo type axle 401 includes an axle housing 402 having axle tubes 406a and 406b connected together by a central member 404. The axle tubes 406a and 406b are adapted to receive and rotatably support output axle shafts 414a and 414b. The axle housing 402 is formed separate and apart from a carrier 422. This central member 404 is generally hollow and cylindrical in shape, having a large generally circular opening 410 formed therethrough. During assembly, a differential 420 is first assembled within the carrier 422, then the carrier 422 is secured to the central member 404 of the axle housing 402. The overall shape of this type of axle housing (i.e., the generally round shape of the central member 404 and the elongated tubes 406a and 406b extending therefrom) generally resembles the shape of a banjo musical instrument. Hence, this type of axle housing is referred to as the Banjo type axle housing. The Banjo type axle housings are advantageous because the carrier 422 and differential 420 can be removed from the axle assembly 401 for service without disturbing the other components thereof.

However, both Banjo and Salisbury type axles have their disadvantages. Thus, there is a need for a rigid drive axle assembly that combines the advantages of both Banjo and Salisbury type axles and lessens their shortcomings.

SUMMARY OF THE INVENTION

The present invention provides a novel rigid drive axle assembly for motor vehicles. The rigid drive axle assembly in accordance with the present invention comprises a support beam member having a substantially flat, enlarged central section and two opposite arm sections axially outwardly extending from the central section. The drive axle assembly further comprises a differential assembly fastened to the enlarged central section of the support beam member, and two opposite axle shaft members outwardly extending from the differential assembly, and rotatably supported by the arm sections of the support beam member so that the axle shaft members are spaced from the central section of the support beam member in a driving direction of the motor vehicle. Distal ends of the axle shaft members are provided with flange members adapted for mounting corresponding wheel hubs.

The differential assembly includes a differential carrier frame member fastened to the central section of the support beam member, and provided for rotatably supporting a differential case and a drive pinion. The differential case houses a conventional differential gear mechanism, well known to those skilled in the art. The drive pinion has a pinion gear in continuous meshing engagement with a ring gear, and a pinion shaft operatively coupled to a vehicular drive shaft driven by a vehicular powerplant through an input yoke. The differential assembly is enclosed into a housing formed by a rear cover and a front cover secured to opposite surfaces of the central section of the beam member in any appropriate manner well known in the art. The front cover has a font opening for rotatably supporting and receiving therethrough a distal end of the pinion shaft of the drive pinion. The rear cover incorporates two opposite through holes for receiving the axle shaft members therethrough. Each of the through holes is provided with a self-centering seal.

The differential carrier frame member is, preferably, a single-piece metal part manufactured by casting or forging. The differential carrier frame member has a generally Y-shaped configuration and includes a neck portion and two opposite, axially spaced, coaxial bearing hub portions attached to the neck portion through respective leg portions. The neck portion has an opening therethrough adapted for receiving and rotatably supporting the drive pinion through an appropriate anti-friction bearing, preferably a roller bearing. The bearing hub portions are provided with respective openings therethrough adapted for receiving appropriate anti-friction bearings for rotatably supporting the differential carrier. Moreover, the bearing hub portions are provided with mounting flange portions.

In accordance with the first exemplary embodiment of the present invention, the support beam member has the substantially flat, enlarged central section and the two opposite, substantially rectangular arm sections axially outwardly extending from the central section. Preferably, the support beam member is formed of a single-piece C-channel body manufactured by a metal deforming, such as stamping, having a substantially flat, enlarged central section and two opposite arm sections axially outwardly extending from the central section. The flat enlarged central section is further provided with a central opening therethrough adapted for receiving the differential carrier frame member of the differential assembly. The support beam member further includes two structural plates attached to the arm sections so as to form the tubular arm sections of substantially rectangular cross-section.

In accordance with the second exemplary embodiment of the present invention, the support beam member has the substantially flat, enlarged central section and the two opposite, substantially cylindrical arm sections axially outwardly extending from the central section. Preferably, the support beam member is formed of a single-piece C-channel body manufactured by a metal deforming, such as stamping, having a substantially flat, enlarged central section and two opposite arm sections axially outwardly extending from the central section. The flat enlarged central section is further provided with a central opening therethrough adapted for receiving the differential carrier frame member of the differential assembly. The arm sections of the single-piece C-channel body are deformed so as to form the substantially cylindrical arm sections of the support beam member.

In accordance with the third exemplary embodiment of the present invention, the support beam member has a substantially flat, enlarged central section and two opposite substantially flat arm sections axially outwardly extending from the central section. Preferably, in this embodiment, the support beam member is formed of a substantially flat integral profiled body. Preferably, the body is a substantially flat, I-shaped metal profile.

The body has an enlarged central section and two opposite arm sections axially outwardly extending from the central section. The enlarged central section of the body defines the central section of the support beam member. The enlarged central section is further provided with a central opening therethrough adapted for receiving the differential carrier frame member. Fixed at distal ends of the arm sections of the support beam member are corresponding shaft supporting brackets. Each of the shaft supporting brackets has a hole therethrough adapted to receive and rotatably support the axle shaft members in a spaced relationship with respect to the body of the support beam member.

Therefore, the axle assembly in accordance with the present invention represents a novel arrangement of the drive axle assembly providing a number of advantages over the currently employed Salisbury and Banjo style axles, such as improved strength to weight ratio, ease of manufacturing and reduced manufacturing cost due to the use of simple metal stampings to produce the support beam member and the front cover, ease of assembly/disassembly and servicing of the axle assembly, and improved modularity and commonality of axle components.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. As used herein, the words "front" and "rear" in the following description are referred with respect to a driving direction of a motor vehicle, as indicated in the accompanying drawing figures by an arrow F.

Figure 3:
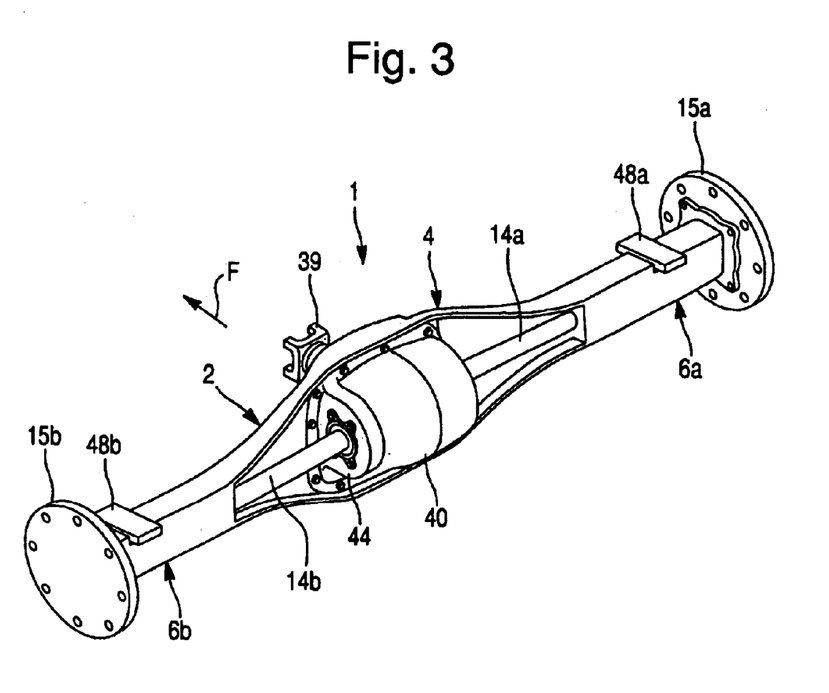
FIG. 3 is a perspective view from the rear of an axle assembly in accordance with the first embodiment of the present invention.
Figure 4:
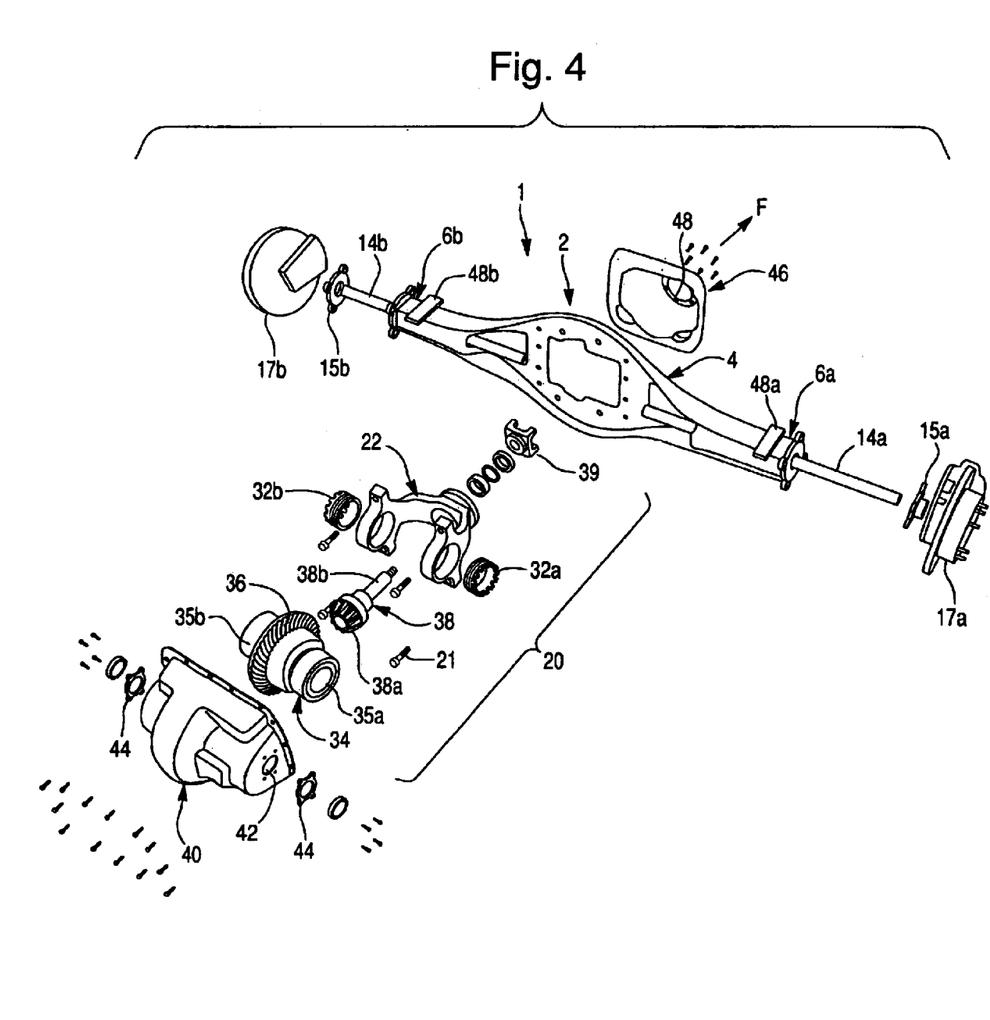
FIG. 4 is an exploded perspective view from the rear of the axle assembly in accordance with the first embodiment the present invention.
Figure 5:
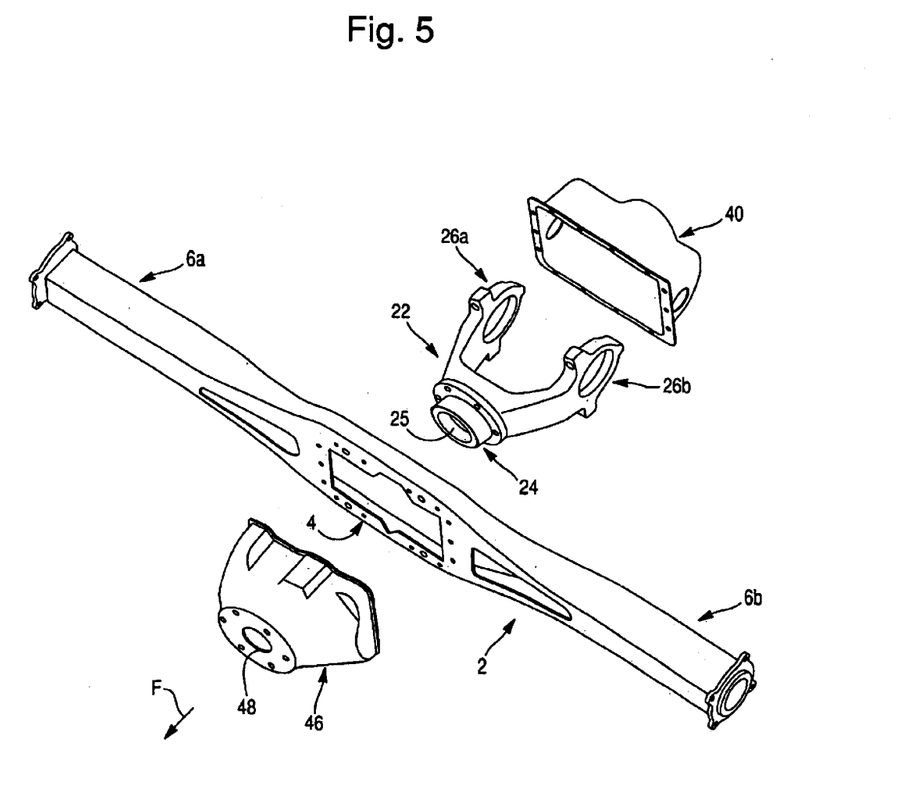
FIG. 5 is a partial exploded perspective view from the front of the axle assembly in accordance with the first embodiment the present invention.

FIGS. 3–5 depict a vehicle drive axle assembly 1 in accordance with the first exemplary embodiment of the present invention. The drive axle assembly 1 comprises a support beam member 2 having a substantially flat, enlarged central section 4 and two opposite, substantially tubular arm sections 6a and 6b axially outwardly extending from the central section 4. The flat central section 4 of the support beam member 2 defines a support plane that to the driving direction F of the motor vehicle.

The drive axle assembly 1 further comprises a differential assembly 20 fastened to the enlarged central section 4 of the support beam member 2, and two opposite axle shaft members 14a and 14b outwardly extending from the differential assembly 20, and rotatably supported by the arm sections 6a and 6b of the support beam member 2 so that the axle shaft members 14a and 14b are spaced from the central section 4 of the beam member 2 in the driving direction F of the motor vehicle. Distal ends of the axle shaft members 14a and 14b are provided with flange members 15a and 15b, respectively, adapted for mounting corresponding wheel hubs 17a and 17b.

The differential assembly 20 includes a differential carrier frame member 22 fastened to the central section 4 of the beam member 2, and provided for rotatably supporting a differential case 34 and a drive pinion 38. The differential case 34 houses a conventional differential gear mechanism, well known to those skilled in the art. The drive pinion 38 has a pinion gear 38a in continuous meshing engagement with a ring gear 36, and a pinion shaft 38b operatively coupled to a vehicular drive shaft (not shown) driven by a vehicular powerplant (not shown), such as an internal combustion engine, through an input yoke 39. The ring gear 36 is conventionally secured to the differential case 34 in any appropriate manner well known in the art.

Therefore, the differential assembly 20 of the present invention is a self-contained unit wherein the differential carrier frame member 22 supports all the significant elements of the differential assembly and a final drive, such as the differential case 34 housing the differential gear mechanism, differential bearings 35a and 35b, threaded differential adjusters 32a and 32b, differential adjuster locks, oil seals, the drive pinion 38, drive pinion bearings, and the input yoke 39. Preferably, the differential carrier frame member 22 fastened to the central section 4 of the support beam member 2 using conventional fasteners, such as bolts 21. The differential carrier frame member 22 of the present invention improves the modularity of design of the differential assembly, substantially simplifies the assembly and servicing of the differential assembly, and reduces the number of required machining operations.

In order to prevent the differential assembly 20 from contamination and provide a supply of a lubricant, the differential assembly 20 is enclosed into a housing formed by a rear cover 40 and a front cover 46 secured to opposite surfaces of the central section 4 of the beam member 2 in any appropriate manner well known in the art. In accordance with the preferred embodiment of the present invention, both the rear cover 40 and the front cover 46 are manufactured by metal stamping of any appropriate metal material, such as steel. Preferably, the front cover 46 is welded to a front surface of the central section 4 of the beam member 2, while the rear cover 40 is fastened to a rear surface of the central section 4 of the beam member 2 using conventional fasteners. The front cover 46 has a front opening 48 (shown in FIG. 4) for rotatably supporting and receiving therethrough a distal end of the pinion shaft 38b of the drive pinion 38. The rear cover 40 incorporates two opposite through holes 42 (only one is shown in FIG. 4) for receiving the axle shaft members 14a and 14b therethrough. Each of the through holes 42 is provided with a self-centering seal 44.

The opposite arm sections 6a and 6b of the support beam member 2 may be provided with spring seats 48a and 48b, respectively.

Figure 6:
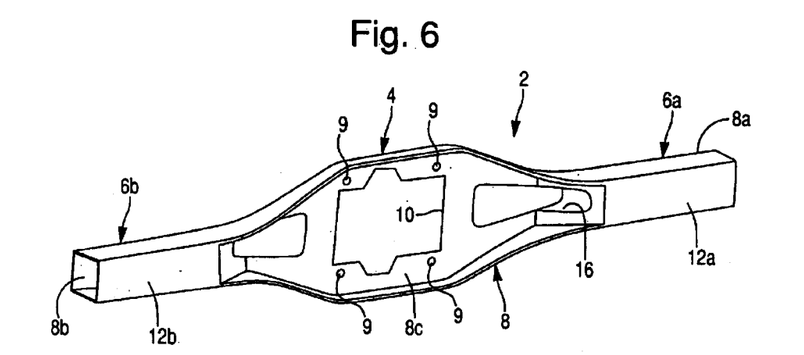
FIG. 6 is a perspective view of a support beam member of the axle assembly in accordance with the first exemplary embodiment of the present invention.

FIG. 6 depicts in detail the support beam member 2 in accordance with the first exemplary embodiment of the present invention. As was explained above, the support beam member 2 has the substantially flat, enlarged central section 4 and the two opposite, substantially tubular arm sections 6a and 6b axially outwardly extending from the central section 4. Preferably, in this embodiment, the support beam member 2 is formed of a single-piece C-channel body 8 manufactured by a metal deforming, such as stamping, having a substantially flat, enlarged central section 8c and two opposite arm sections 8a and 8b axially outwardly extending from the central section 8c.

The substantially flat, enlarged central section 8c of the body 8 defines the central section 4 of the support beam member 2. The flat enlarged central section 8c is further provided with a central opening 10 therethrough adapted for receiving the differential carrier frame member 22 of the differential assembly 20. A plurality of bolt holes 9 are formed in the central section 8c adjacent to the central opening 10 and adapted to receive the bolts 21 for fastening the carrier frame member 22 to the flat central section 4 of the support beam member 2.

The support beam member 2 further includes two structural plates 12a and 12b attached to the arm sections 8a and 8b, respectively, in any appropriate manner, such as welding, so as to form the substantially tubular arm sections 6a and 6b of the support beam member 2 housing the axle shaft members 14a and 14b. As shown in FIG. 6, the tubular arm sections 6a and 6b of the support beam member 2 have substantially rectangular cross-section. Inward ends of each of the structural plates 12a and 12b is provided with a notch 16 receiving the axle shaft member 14a or 14b therethrough in a spaced relationship with respect to the central section 8c of the body 8 of the support beam member 2.

Figure 7:
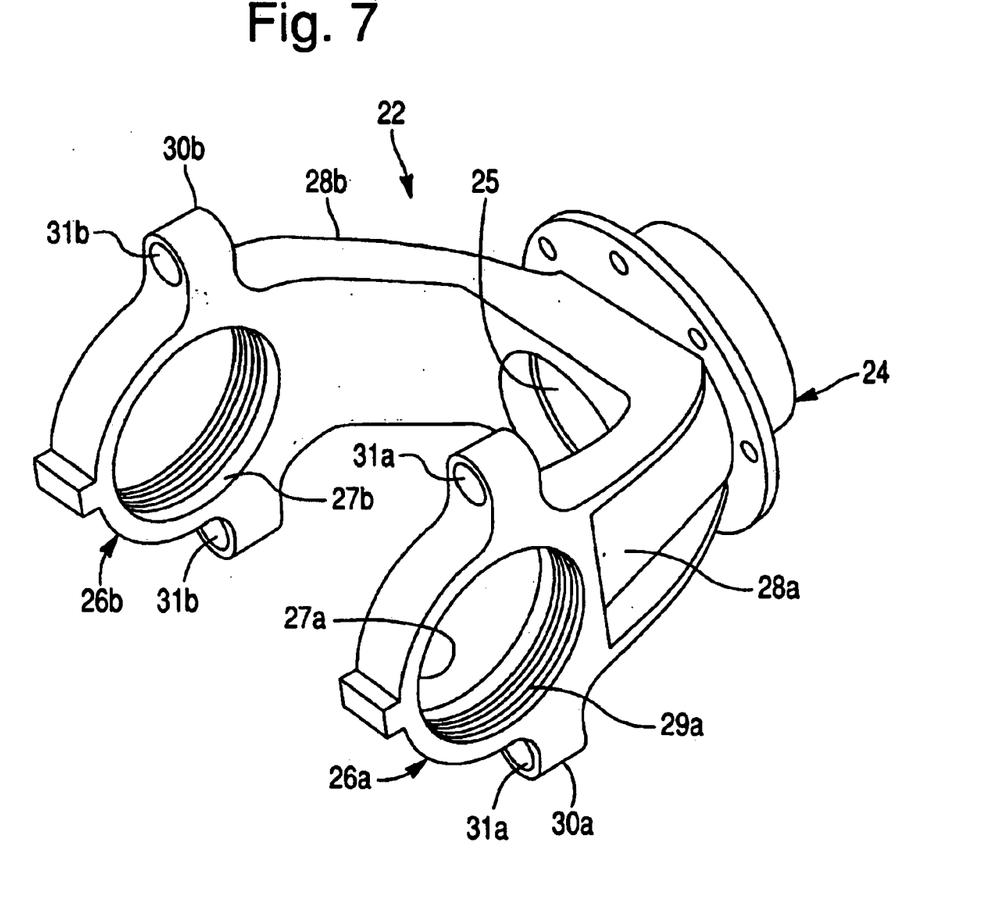
FIG. 7 is perspective view of a differential carrier frame member in accordance with the present invention.

The differential carrier frame member 22, illustrated in detail in FIG. 7, is, preferably, a single-piece metal part manufactured by casting or forging. The differential carrier frame member 22 has a generally Y-shaped configuration and includes a neck portion 24 and two opposite, axially spaced, coaxial bearing hub portions 26a and 26b attached to the neck portion 24 through respective leg portions 28a and 28b. The neck portion has an opening 25 therethrough adapted for receiving and rotatably supporting the drive pinion 38 through an appropriate anti-friction bearing (not shown), preferably a tapered roller bearing. The bearing hub portions 26a and 26b are provided with respective openings 27a and 27b therethrough adapted for receiving appropriate anti-friction bearings 35a and 35b for rotatably supporting the differential carrier 34. Preferably, the anti-friction bearings 35a and 35b are tapered roller bearings. Moreover, the bearing hub portions 26a and 26b are provided with mounting flange portions 30a and 30b respectively, for fastening the differential carrier frame member 22 to the flat central section 4 of the support beam member 2. Preferably, each of the mounting flange portions 30a and 30b has two mounting holes 31a and 31b, respectively, adapted to receive the bolts. In an assembled condition of the drive axle assembly 1, the bolts 21 extend through the mounting holes 31a and 31b in the differential carrier frame member 22 and the bolt holes 9 formed in the central section 8c of the body 8 to extend through the support beam member 2, thus fastening the differential carrier frame member 22 to the central section 4 of the beam member 2.

Figure 8:
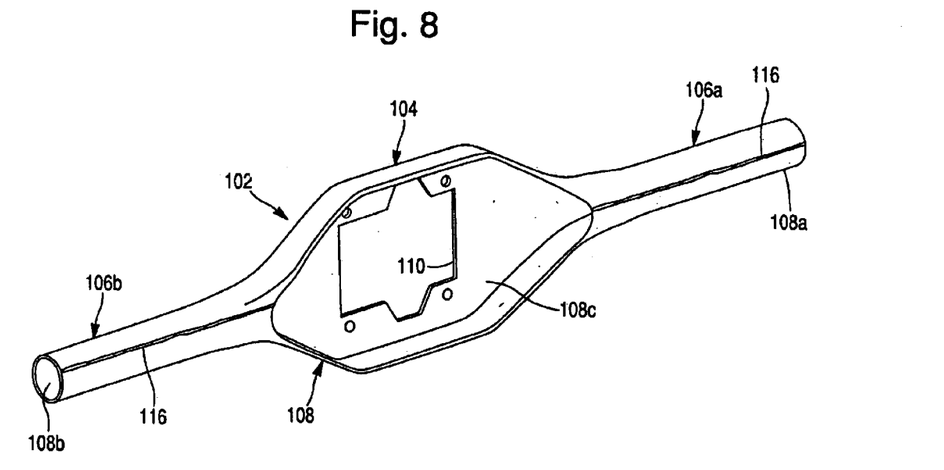
FIG. 8 is a perspective view of a support beam member of the axle assembly in accordance with the second exemplary embodiment of the present invention.

FIG. 8 of the drawings depicts a second exemplary embodiment of a drive axle assembly of the present invention. The drive axle assembly of the second exemplary embodiment of the present invention corresponds substantially to the drive axle assembly of the first exemplary embodiment shown in FIGS. 3–5 and 7, and only the support beam member of the axle assembly, which differs, will therefore be explained in detail below. To simplify the description, all elements of the second exemplary embodiment of the present invention similar to those of the first exemplary embodiment are designated by numerals 100 higher. The parts in common with FIGS. 3–5 and 7 are designated by the same reference numeral.

FIG. 8 depicts in detail a support beam member 102 in accordance with the second exemplary embodiment of the present invention. As was explained above, the support beam member 102 has a substantially flat, enlarged central section 104 and two opposite arm sections 106a and 106b axially outwardly extending from the central section 104. Preferably, in this embodiment, the support beam member 102 is formed of a single-piece C-channel body 108 manufactured by a metal deforming, such as stamping, having a substantially flat, enlarged central section 108c and two opposite arm sections 108a and 108b axially outwardly extending from the central section 108c.

The substantially flat, enlarged central section 108c of the body 108 defines the central section 104 of the support beam member 102. The flat enlarged central section 108c is further provided with a central opening 110 therethrough adapted for receiving the differential carrier frame member 22 of the differential assembly 20 (not shown in FIG. 8). A plurality of bolt holes (not shown) are formed in the enlarged central section 108c adjacent to the central opening 110 and adapted to receive the bolts for fastening the carrier frame member 22 to the support beam member 102.

The arm sections 108a and 108b of the C-channel body 108 are plastically deformed to form a substantially cylindrical arm sections 106a and 106b with seam welds 116 along a neutral axis of the thereof. The cylindrical arm sections 106a and 106b of the support beam member 102 houses the axle shaft members 14a and 14b (not shown in FIG. 8) in a spaced relationship with respect to the flat central section 108c of the body 108 of the support beam member 102. Those of ordinary skill in the art will appreciate that arm sections 106a and 106b may have many other shapes that could be used for the same purpose, such as elliptical. Thus, the support beam member 102 is formed of a single-piece C-channel body 108.

Figure 9:
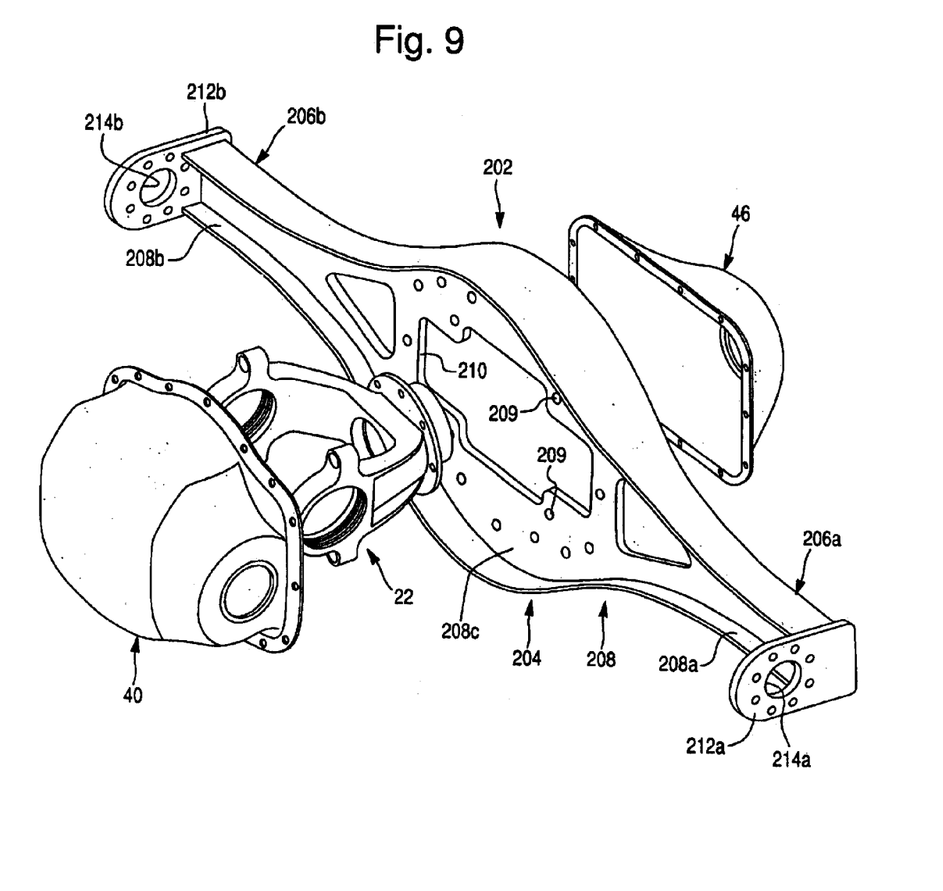
FIG. 9 is a partial exploded perspective view from the rear of an axle assembly in accordance with the third exemplary embodiment of the present invention.
Figure 10:
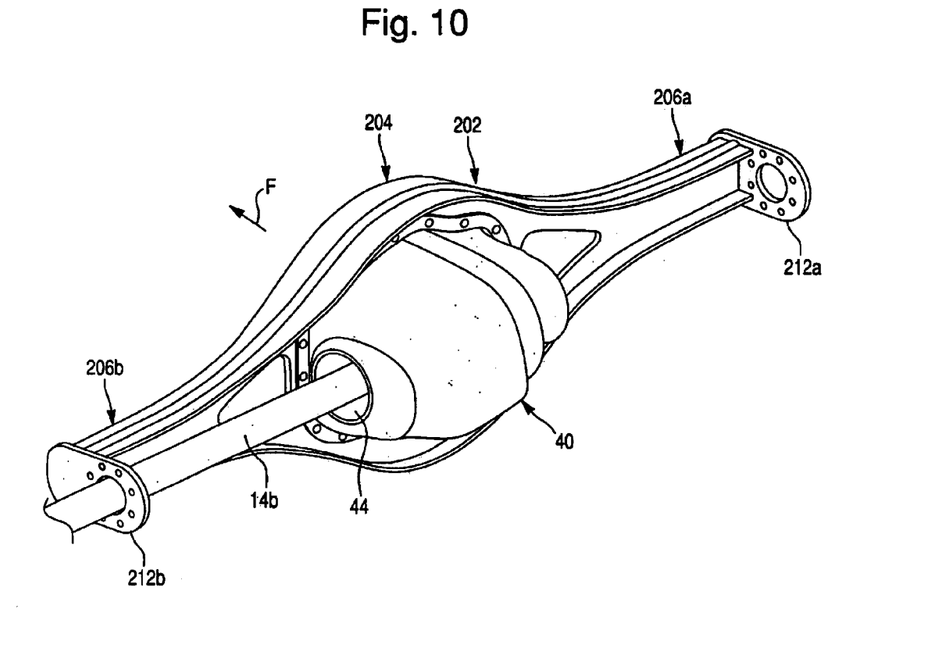
FIG. 10 is a perspective view from the rear of the axle assembly in accordance with the third exemplary embodiment of the present invention.

FIGS. 9 and 10 of the drawings depict a third exemplary embodiment of a drive axle assembly of the present invention. The drive axle assembly of the third exemplary embodiment of the present invention corresponds substantially to the drive axle assembly of the first exemplary embodiment shown in FIGS. 3–5 and 7, and only the support beam member of the axle assembly, which differs, will therefore be explained in detail below. To simplify the description, all elements of the third exemplary embodiment of the present invention similar to those of the first exemplary embodiment are designated by numerals 200 higher. The parts in common with FIGS. 3–5 and 7 are designated by the same reference numeral.

FIG. 9 depicts in detail a support beam member 202 in accordance with the third exemplary embodiment of the present invention. As was explained above, the support beam member 202 has a substantially flat, enlarged central section 204 and two opposite substantially flat arm sections 206a and 206b axially outwardly extending from the central section 204. Preferably, in this embodiment, the support beam member 202 is formed of a substantially flat integral profiled body 208. Preferably, the body 208 is a substantially flat, I-shaped metal profile that could be a single-piece part, or, alternatively, made of two C-channel metal profiles welded together. Those of ordinary skill in the art will appreciate that there are many various profiles that could be used for the same purpose.

The body 208 has an enlarged central section 208c and two opposite arm sections 208a and 208b axially outwardly extending from the central section 208c. The enlarged central section 208c of the body 208 defines the central section 204 of the support beam member 202. The enlarged central section 208c is further provided with a central opening 210 therethrough adapted for receiving the differential carrier frame member 22. A plurality of bolt holes 209 are formed in the central section 208c adjacent to the central opening 210 and adapted to receive the bolts for fastening the carrier frame member 22 to the support beam member 202.

As illustrated in FIGS. 9 and 10, fixed at distal ends of the arm sections 206a and 206b of the support beam member 202 are corresponding shaft supporting brackets 212a and 212b. Each of the shaft supporting brackets 212a and 212b has a hole (214a and 214b, respectively) therethrough adapted to receive and rotatably support the axle shaft members 14a and 14b (only one axle shaft member is shown in FIG. 10) in a spaced relationship with respect to the body 208 of the support beam member 202.

Therefore, the axle assembly in accordance with the present invention represents a novel arrangement of the drive axle assembly including the support beam member having the substantially flat central section and two opposite arm sections axially outwardly extending from said central section, the differential assembly secured to said flat central section of the support beam member, and two opposite axle shaft members outwardly extending from the differential assembly and rotatably supported by the arm sections in a spaced relationship with respect to the central section of the support beam member. The present invention provides a number of advantages over the currently employed Salisbury and Banjo style axles:
  improved strength to weight ratio;
  ease of manufacturing and reduced manufacturing cost due to the use of simple metal stampings to produce the support beam member and the front and rear covers;
  ease of assembly/disassembly and servicing of the axle assembly;
  improved modularity and commonality of axle components.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An axle assembly for a motor vehicle comprising:
    a support beam member having a substantially flat central plate section and two arm sections extending oppositely from said central plate section;
    a differential assembly secured to said flat central plate section of said support beam member;
    two axle shaft members extending oppositely from said differential assembly and rotatably supported on said arm sections, said axle shaft members being spaced from said flat central plate section of said support beam member; and a rear cover and a front cover secured to opposite surfaces of said flat central plate section of said support beam member for enclosing said differential assembly.

2. The axle assembly as defined in claim 1, wherein said flat central plate section of said support beam member defines a support plane that is substantially orthogonal to a driving direction of said motor vehicle.

3. The axle assembly as defined in claim 1, wherein each of said arm sections of said support beam member has tubular shape.

4. The axle assembly as defined in claim 3, wherein each of said arm sections of said support beam member is substantially rectangular in cross-section.

5. The axle assembly as defined in claim 3, wherein each of said arm sections of said support beam member is substantially circular in cross-section.

6. The axle assembly as defined in claim 1, wherein said central plate section of said support beam member has a substantially C-channel cross-section across the entire height thereof.

7. The axle assembly as defined in claim 1, wherein said two arm sections are formed integrally with said central plate section.

8. The axle assembly as defined in claim 1, wherein said two arm sections are formed integrally with said central plate section as a unitary single-piece part.

9. The axle assembly as defined in claim 1, wherein each of said arm sections of said support beam member is substantially flat and has a shaft supporting bracket provided thereon for rotatably supporting said axle shaft members.

10. The axle assembly as defined in claim 9, wherein said shaft supporting brackets are provided at a distal end of said arm sections of said support beam member.

11. The axle assembly as defined in claim 9, wherein said support beam member has a substantially I-shaped cross-section.

12. The axle assembly as defined in claim 11, wherein said I-beam cross-section of said support beam member is integrally formed by two C-shaped beams secured to each other.

13. The axle assembly as defined in claim 1, wherein said differential assembly includes a differential carrier frame member for rotatably supporting a differential case and a drive shaft.

14. The axle assembly as defined in claim 13, wherein said flat support beam member has a central opening such that said differential carrier frame member extends through said central opening.

15. The axle assembly as defined in claim 1, wherein said (central plate section of said support beam member has a central opening therethrough and said differential assembly extends through said central opening.

16. The axle assembly as defined in claim 15, wherein said differential assembly includes a differential carrier frame member fastened to said central plate section of said support beam member so as to extend through said central opening, said differential carrier frame member is provided for rotatably supporting a differential case and a drive pinion of a final drive.

17. The axle assembly as defined in claim 16, wherein said differential carrier frame member has a generally Y-shaped configuration, and includes two coaxially spaced bearing hub portions for rotatably supporting said differential case, a neck portion for rotatably supporting said drive pinion, and leg portions for coupling said neck portion to said bearing hub portions.

18. The axle assembly as defined in claim 17, wherein said differential earner frame member is provided with a mounting flange portion for fastening said differential carrier frame member to said central plate section of said support beam member.

19. The axle assembly as defined in claim 18, wherein each of said bearing hub portions of said differential carrier frame member is provided with said mounting flange portion.

20. The axle assembly as defined in claim 17, wherein said differential carrier frame member is a unitary single-piece part manufactured by one of a casting or forging.

21. The axle assembly as defined in claim 1, wherein further including a rear cover and a front cover secured to opposite surfaces of said flat central section of said support beam member for enclosing said differential assembly, said rear cover having has two opposite through holes for receiving said axle shaft members therethrough.

22. The axle assembly as defined in claim 16, wherein said front cover having a front opening for rotatably supporting and receiving therethrough a pinion shaft of said drive pinion.

23. The axle assembly as defined in claim 1, wherein said central plate section of said support beam member is enlarged relative to said arm sections.

24. The axle assembly as defined in claim 15, wherein said central plate section of said support beam member has opposite front and rear substantially flat surfaces, and wherein a thickness of said central plate section determined by a distance between said front and rear surfaces defines a thickness of said central opening through said central plate section.

25. An axle assembly for a motor vehicle comprising:

a support beam member having a substantially flat central plate section and two arm sections extending oppositely from said central plate section;

a differential assembly secured to said flat central plate section of said support beam member;

two opposite axle shaft members oppositely extending from said differential assembly and rotatably supported on said arm sections, said axle shaft members being spaced from said flat central plate section of said support beam; and a rear cover and a front cover provided at opposite surfaces of said flat central plate section of said support beam member for enclosing said differential assembly.

26. An axle assembly for a motor vehicle comprising:

a support beam member having a substantially flat central plate section and two arm sections extending oppositely from said central plate section;

a differential assembly secured to said flat central plate section of said support beam member;

two axle shaft members extending oppositely from said differential assembly and rotatably supported on said arm sections, said axle shaft members being spaced from said flat central plate section of said support beam member with respect to a driving direction of said motor vehicle; and a rear cover and a front cover secured to opposite surfaces of said flat central plate section of said support beam member for enclosing said differential assembly.

27. An axle assembly for a motor vehicle comprising:

a support beam member having a substantially flat central plate section and two arm sections extending oppositely from said central plate section, said support beam member having a central opening therethrough;

a differential assembly secured to said flat central plate section of said support beam member so that said differential assembly extends through said central opening;

two axle shaft members extending oppositely from said differential assembly and rotatably supported on said arm sections, said axle shaft members being spaced from said flat central plate section of said support beam member with respect to a driving direction of said motor vehicle; and a rear cover and a front cover secured to opposite surfaces of said flat central plate section of said support beam member for enclosing said differential assembly.

28. An axle assembly for a motor vehicle comprising:

a support beam member having a substantially flat central plate section and two arm sections extending oppositely from said central section;

a differential assembly secured to said flat central section of said support beam member; and two axle shaft members extending oppositely from said differential assembly and rotatably supported on said arm sections, said axle shaft members being spaced from said flat central section of said support beam member with respect to a driving direction of said motor vehicle, wherein each of said arm sections of said support beam member being substantially flat and having a shaft supporting bracket provided thereon for rotatably supporting said axle shaft members;

wherein said support beam member having a substantially I-shaped cross-section, and wherein said I-beam cross-section of said support beam member being integrally formed by two C-shaped beams secured to each other.

29. An axle assembly for a motor vehicle comprising:

a support beam member having a substantially flat central plate section and two arm sections extending oppositely from said central section;

a differential assembly secured to said flat central section of said support beam member; and two axle shaft members extending oppositely from said differential assembly and rotatably supported on said arm sections, said axle shaft members being spaced from said flat central section of said support beam member with respect to a driving direction of said motor vehicle, wherein said central plate section of said support beam member has a substantially C-channel cross-section across the entire height thereof.

* * * * *